(12) United States Patent
Hattori et al.

(10) Patent No.: US 7,457,029 B2
(45) Date of Patent: Nov. 25, 2008

(54) METHOD AND APPARATUS FOR MANUFACTURING DISPLAY MEDIUM, AND DISPLAY MEDIUM

(75) Inventors: Yasuhiro Hattori, Cordova, TN (US); Hiroyuki Enomoto, Toyohashi (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 6 days.

(21) Appl. No.: 11/687,158

(22) Filed: Mar. 16, 2007

(65) Prior Publication Data

US 2007/0177249 A1 Aug. 2, 2007

Related U.S. Application Data

(63) Continuation-in-part of application No. PCT/JP2005/016412, filed on Sep. 7, 2005.

(30) Foreign Application Priority Data

Sep. 30, 2004 (JP) ............................ 2004-286962

(51) Int. Cl.
*G02F 1/01* (2006.01)
*G02F 1/167* (2006.01)
*H01J 9/02* (2006.01)
*G09G 3/34* (2006.01)
(52) U.S. Cl. ..................... 359/296; 345/107; 445/35
(58) Field of Classification Search .................. 40/442, 40/447, 452; 345/107; 349/139; 359/296; 445/24, 35, 46, 49; *G02F 1/101, 1/167, 1/1343; G03F 7/11, 7/40; G09F 9/37; H01J 9/02*
See application file for complete search history.

(56) References Cited

U.S. PATENT DOCUMENTS 3,629,654 A * 12/1971 Janning ...................... 315/166

(Continued)

FOREIGN PATENT DOCUMENTS

EP 1795954 A1 * 6/2007

(Continued)

OTHER PUBLICATIONS

Written Opinion of the International Searching Authority (PCT/ISA/237); prepared for Internatiional Application No. PCT/JP2005/016412 (English Language Translation) Nov. 30, 2005.*

*Primary Examiner*—David N Spector
(74) *Attorney, Agent, or Firm*—Baker Botts, LLP

(57) ABSTRACT

A manufacturing apparatus for manufacturing a display medium, the manufacturing apparatus including an image data storing unit that stores image data for text or image to be displayed on the display medium; an electrode pattern generating unit that generates an electrode pattern based on the image data stored in the image data storing unit so that when the text or image is configured of a plurality of independent regions, the electrode pattern has a plurality of integrally and electrically connected electrodes corresponding to a plurality of regions; an electrode forming unit that forms the first electrode on either an electrophoretic medium integrally configured of the second substrate, the second electrode, and the electrophoretic layer or the first substrate based on the electrode pattern generated by the electrode pattern generating unit; and a bonding unit that bonds the electrophoretic medium to the first substrate after the electrode forming unit has formed the first electrode.

7 Claims, 14 Drawing Sheets

U.S. PATENT DOCUMENTS

| | | | |
|---|---|---|---|
| 4,904,901 A * | 2/1990 | Simopoulos et al. | 313/509 |
| 5,504,390 A * | 4/1996 | Topp | 313/509 |
| 5,754,268 A * | 5/1998 | Aihara et al. | 349/155 |
| 6,836,259 B2 * | 12/2004 | Topelberg | 345/43 |
| 7,106,485 B2 * | 9/2006 | Hattori et al. | 359/237 |
| 7,209,281 B2 * | 4/2007 | Takei | 359/296 |
| 7,320,845 B2 * | 1/2008 | Zucker | 429/124 |

FOREIGN PATENT DOCUMENTS

| | | |
|---|---|---|
| JP | 2000-035769 A | 2/2000 |
| JP | 2000035769 | 2/2000 |
| JP | 2000215798 | 8/2000 |
| JP | 2000215798 A | 8/2000 |
| JP | 2003167275 | 6/2003 |
| JP | 2003167275 A | 6/2003 |
| WO | WO 2006/038418 A1 * | 4/2006 |

* cited by examiner

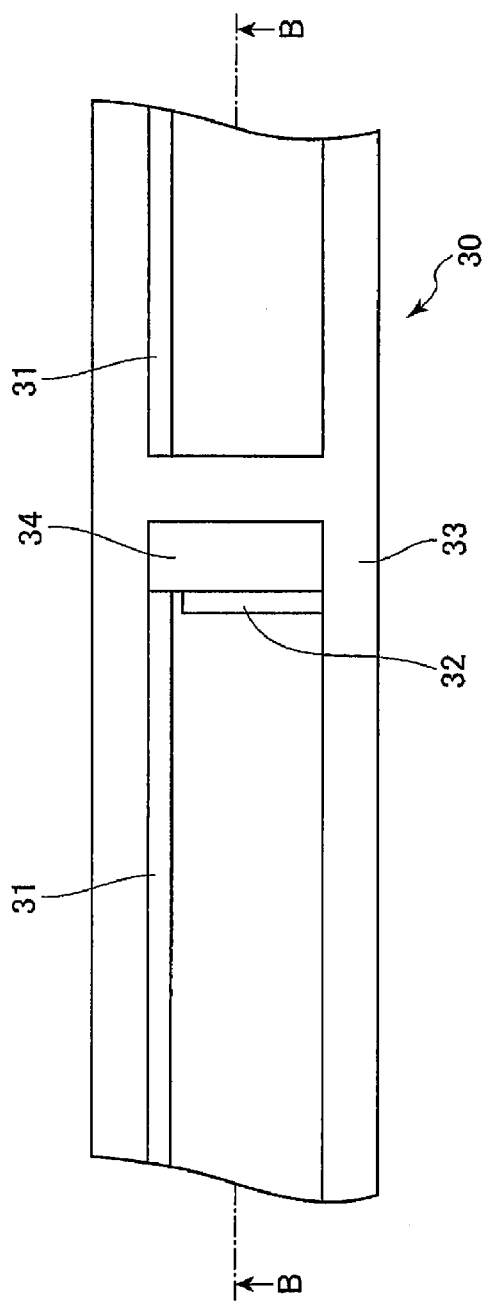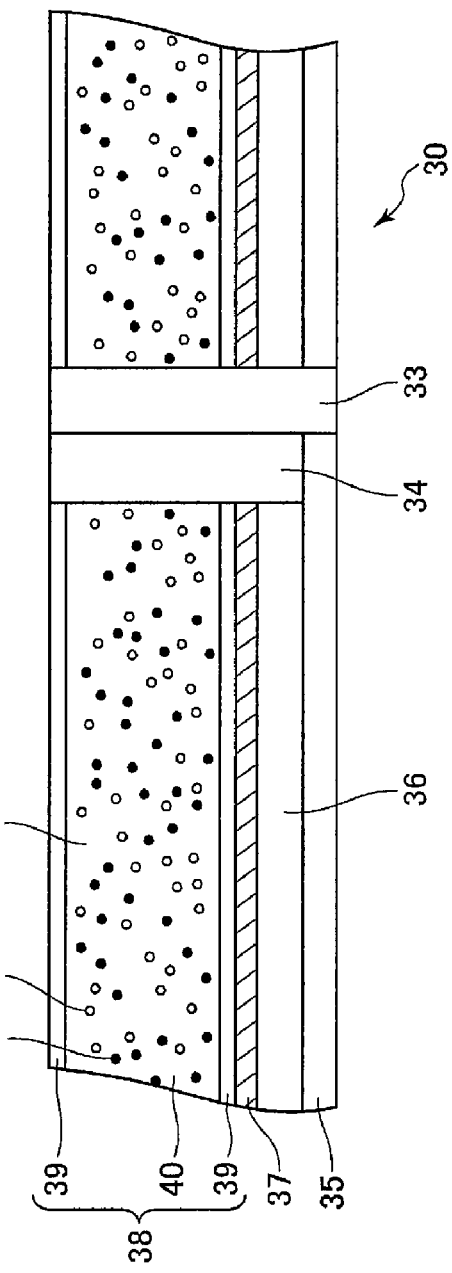

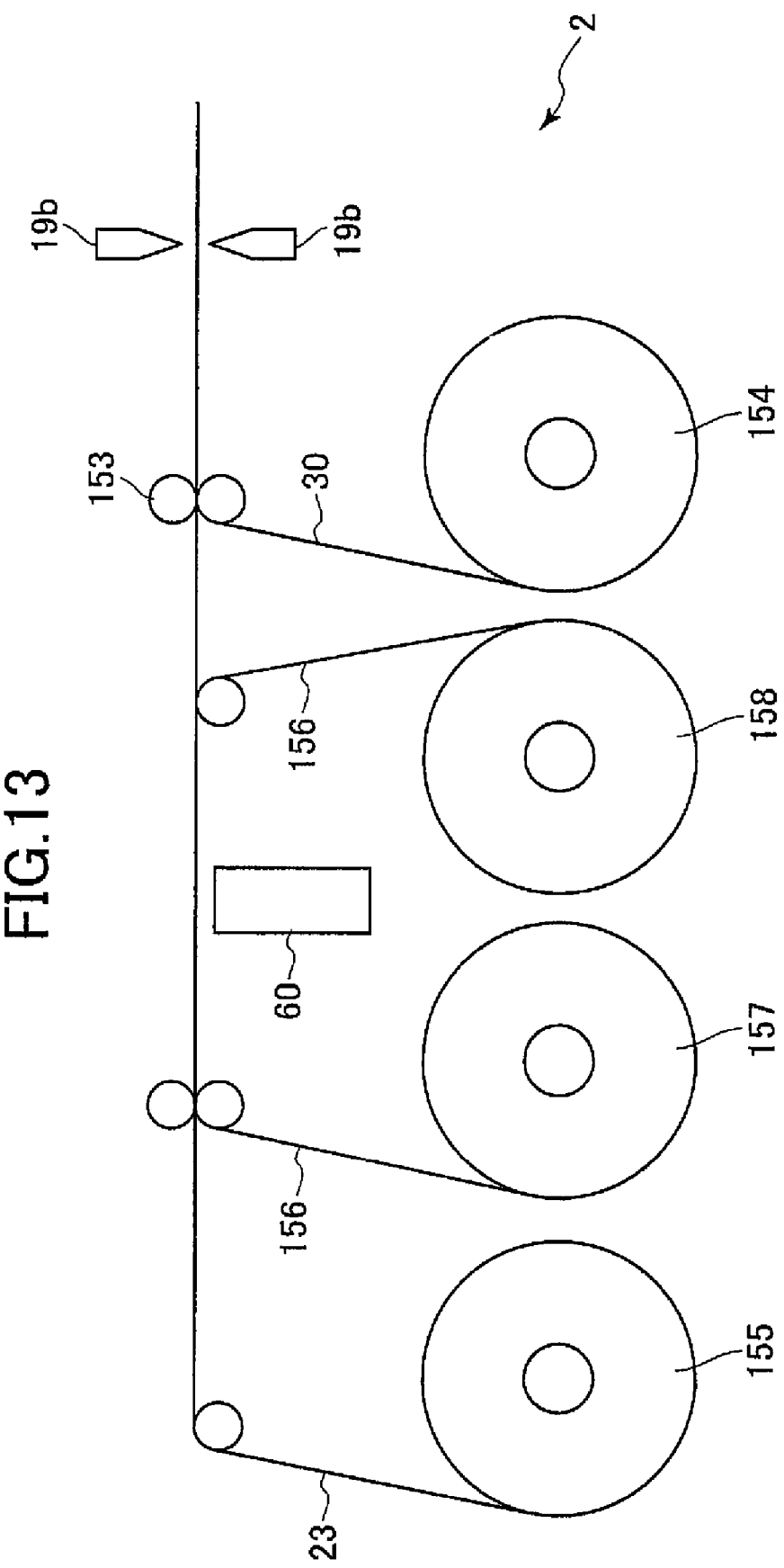

METHOD AND APPARATUS FOR MANUFACTURING DISPLAY MEDIUM, AND DISPLAY MEDIUM

CROSS REFERENCE TO RELATED APPLICATIONS

This application is a continuation-in-part of PCT/JP2005/016412 of an international application designating the United States of America filed on Sep. 7, 2005 (international filing date), and further claims priority based on 35 U.S.C section 119 to Japanese Patent Application No. 2004-286962 filed Sep. 30, 2004.

TECHNICAL FIELD

The present invention relates to a method and apparatus for manufacturing a display medium, and a display medium. The present invention particularly relates to an apparatus for manufacturing a display medium capable of simplifying the production of a display medium for displaying desired text and image corresponding to shapes of electrodes; a method for manufacturing a display medium and a display medium having integrally and electrically connected electrodes shaped to correspond to the desired text or image, and facilitating wiring for supplying electricity to the electrode.

BACKGROUND

An electrophoretic display medium capable of displaying prescribed text or image is well known in the art. this type of electrophoretic display medium, in Japanese Patent Application Publication No. 2000-215798, has electrodes formed on a display surface side in a shape corresponding to the prescribed text or image, and an electrode provided on the non-display surface side. When a voltage is applied between the electrodes on the display surface side and the electrode on the non-display surface side, charged color particles move toward the display surface side, generating a display corresponding to shape of the electrode.

In recent years, there has been increasing demand for a more convenient method of manufacturing these electrophoretic display medium. When producing this type of display medium, it is necessary to provide an electrode shaped to conform to text or image being displayed. Methods known in the art for producing transparent electrodes used in this electrophoretic display medium include a vacuum deposition method for evaporating conductive particles in a vacuum and depositing the evaporated matter on a substrate, sputtering methods using oxide or metal targets, and the like. However, these methods require strict control of ambient atmosphere during film formation and are costly. In addition to these methods, Japanese Patent Application Publication No. 2000-215798 proposes a method of forming a film in order to form an electrode using a film containing conductive particles to transfer a conductive particle-containing layer onto a substrate.

SUMMARY

However, a problematic point with the technique proposed in patent reference 1 described above is that many steps must be performed after forming the conductive particle-containing layer, such as a step for forming a resist film on the conductive particle-containing layer, a step for exposing the resist film, a step for developing the resist film, a step for etching the conductive particle-containing layer, and a step for burning the conductive particle-containing layer, thereby requiring complex operations and a high production cost for forming electrodes in desired patterns. Further, if the electrodes formed to correspond to the prescribed text or image are separate and independent of each other complex wiring must be performed to supply electricity to each electrode, requiring further complex operations.

To resolve the problems described above, it is an object of the present invention to provide an apparatus for manufacturing a display medium capable of simplifying the production of a display medium for displaying desired text and image corresponding to the shapes of electrodes; a method for manufacturing a display medium and the display medium having integrally and electrically connected electrodes shaped to correspond to the desired text or image, and facilitating wiring for supplying electricity to the electrode.

To achieve the above and other objects, one aspect of the present invention provides a manufacturing apparatus for manufacturing a display medium. The display medium includes a transparent first substrate that constitutes a display surface; a second substrate that opposes an underside surface side of the display surface of the first substrate and separates from the underside surface with a prescribed gap; an electrophoretic layer that is disposed in the prescribed gap and has a liquid in which a plurality of charged particles are dispersed; a first electrode that is disposed between the electrophoretic layer and the first substrate and has a prescribed shape; and a second electrode that is disposed between the electrophoretic layer and the second substrate, wherein voltage applied across the first electrode and the second electrode causes the charged particles in the electrophoretic layer to move toward either an area facing the first electrode or an area facing the second electrode for producing a display corresponding to the shape of the first electrode.

The manufacturing apparatus includes an image data storing unit that stores image data for text or image to be displayed on the display medium; an electrode pattern generating unit that generates an electrode pattern based on the image data stored in the image data storing unit so that when the text or image is configured of a plurality of independent regions, the electrode pattern has a plurality of integrally and electrically connected electrodes corresponding to a plurality of regions; an electrode forming unit that forms the first electrode on either an electrophoretic medium integrally configured of the second substrate, the second electrode, and the electrophoretic layer or the first substrate based on the electrode pattern generated by the electrode pattern generating unit; and a bonding unit that bonds the electrophoretic medium to the first substrate after the electrode forming unit has formed the first electrode.

In another aspect of the invention, there is provided a manufacturing method for manufacturing a display medium. The display medium includes a transparent first substrate that constitutes a display surface; a second substrate that opposes an underside surface side of the display surface of the first substrate and separates from the underside surface with a prescribed gap; an electrophoretic layer that is disposed in the prescribed gap and has a liquid in which a plurality of charged particles are dispersed; a first electrode that is disposed between the electrophoretic layer and the first substrate and has a prescribed shape; and a second electrode that is disposed between the electrophoretic layer and the second substrate, wherein voltage applied across the first electrode and the second electrode causes the charged particles in the electrophoretic layer to move toward either an area facing the first electrode or an area facing the second electrode for producing a display corresponding to the shape of the first electrode.

The manufacturing method includes:

generating an electrode pattern so that when image data for the text or image to be displayed on the display medium is configured of a plurality of independent regions, the electrode pattern has a plurality of integrally and electrically connected electrodes disposed in correspondence to the plurality of regions;

forming the first electrode on either the electrophoretic medium integrally configured of the second substrate, the second electrode, the electrophoretic layer or the first substrate based on electrode pattern generated in the generating step; and bonding the electrophoretic medium to the first substrate after forming the first electrode in the forming step.

In another aspect of the invention, there is provided a manufacturing method for manufacturing a display medium. The display medium includes a transparent first substrate that constitutes a display surface; a second substrate that opposes an underside surface side of the display surface of the first substrate and separates from the underside surface with a prescribed gap; an electrophoretic layer that is disposed in the prescribed gap and has a liquid in which a plurality of charged particles are dispersed; a first electrode that is disposed between the first substrate and the electrophoretic layer and has a prescribed electrode pattern corresponding to a shape of text or image; an auxiliary electrode that is disposed between the first substrate and the electrophoretic layer so as to surround at least the electrode pattern of the first electrode; and a second electrode that is disposed between the second substrate and the electrophoretic layer, wherein voltages generating electric fields having different directions with the second electrode are applied to the first electrode and auxiliary electrode, causing the charged particles in the electrophoretic layer to move and produce a display corresponding to the shape of the first electrode.

The manufacturing method includes:

generating an electrode pattern so that when the text or image to be displayed on the display medium has an enclosed region, the enclosed region of the electrode pattern has a partially opened shape;

forming the first electrode and the auxiliary electrode on either the electrophoretic medium integrally configured of the second substrate, the second electrode, and the electrophoretic layer or the first substrate based on the electrode pattern generated in the generating step so that a gap is formed between the first electrode and auxiliary electrode, the auxiliary electrode including integrally and electrically connected electrodes disposed in a region surrounding the electrode pattern of the first electrode and a region corresponding to the enclosed region; and bonding the electrophoretic medium to the first substrate after forming the first electrode and the auxiliary electrode in the forming step.

In another aspect of the invention, there is provided a display medium including a transparent first substrate that constitutes a display surface; a second substrate that opposes an underside surface side of the display surface of the first substrate and separate from the underside surface with a prescribed gap; an electrophoretic layer that is disposed in the prescribed gap and having a liquid in which a plurality of charged particles are dispersed; a first electrode that is disposed between the electrophoretic layer and the first substrate and has a prescribed shape; and a second electrode that is disposed between the electrophoretic layer and the second substrate, wherein voltage applied across the first electrode and the second electrode causes the charged particles in the electrophoretic layer to move toward either an area facing the first electrode or an area facing the second electrode for producing a display corresponding to the shape of the first electrode. When the text or image to be displayed on the display surface includes a plurality of independent regions, the first electrode includes a plurality of integrally and electrically connected electrodes disposed to correspond to the plurality of regions.

In another aspect of the invention, there is provided a display medium including a transparent first substrate that constitutes a display surface; a second substrate that opposes an underside surface side of the display surface of the first substrate and separates from the underside surface with a prescribed gap; an electrophoretic layer that is disposed in the prescribed gap and has a liquid in which a plurality of charged particles are dispersed; a first electrode that is disposed between the first substrate and the electrophoretic layer and has a prescribed electrode pattern corresponding to a shape of text or image; first auxiliary electrode that is disposed between the first substrate and the electrophoretic layer so as to surround at least an electrode pattern for the first electrode; and a second electrode that is disposed between the second substrate and the electrophoretic layer, wherein voltages generating electric fields having different directions with the second electrode are applied to the first electrode and first auxiliary electrode, causing the charged particles in the electrophoretic layer to move and produce a display corresponding to the shape of the first electrode. When the text or image to be displayed on the display surface has enclosed region, a second auxiliary electrode is provided for the enclosed region, and the first electrode have an electrode pattern in which part of the enclosed region in a region constituting the text or image is opened so that the second auxiliary electrode corresponding to the enclosed region is integrally and electrically connected to the first auxiliary electrode surrounding the periphery of the first electrode.

BRIEF DESCRIPTION OF THE DRAWINGS

FIG. 9A is a plan view showing the display surface side of an electrophoretic tape according to the preferred embodiment of the present invention.

FIG. 9B is a cross-sectional view of the electrophoretic tape along the line B-B in FIG. 9A.

FIG. 13 illustrates a method of manufacturing the display medium on an apparatus, having a thermal transfer printer, for manufacturing a display medium according to the preferred embodiment of the present invention.

DETAILED DESCRIPTION

Figure 1:
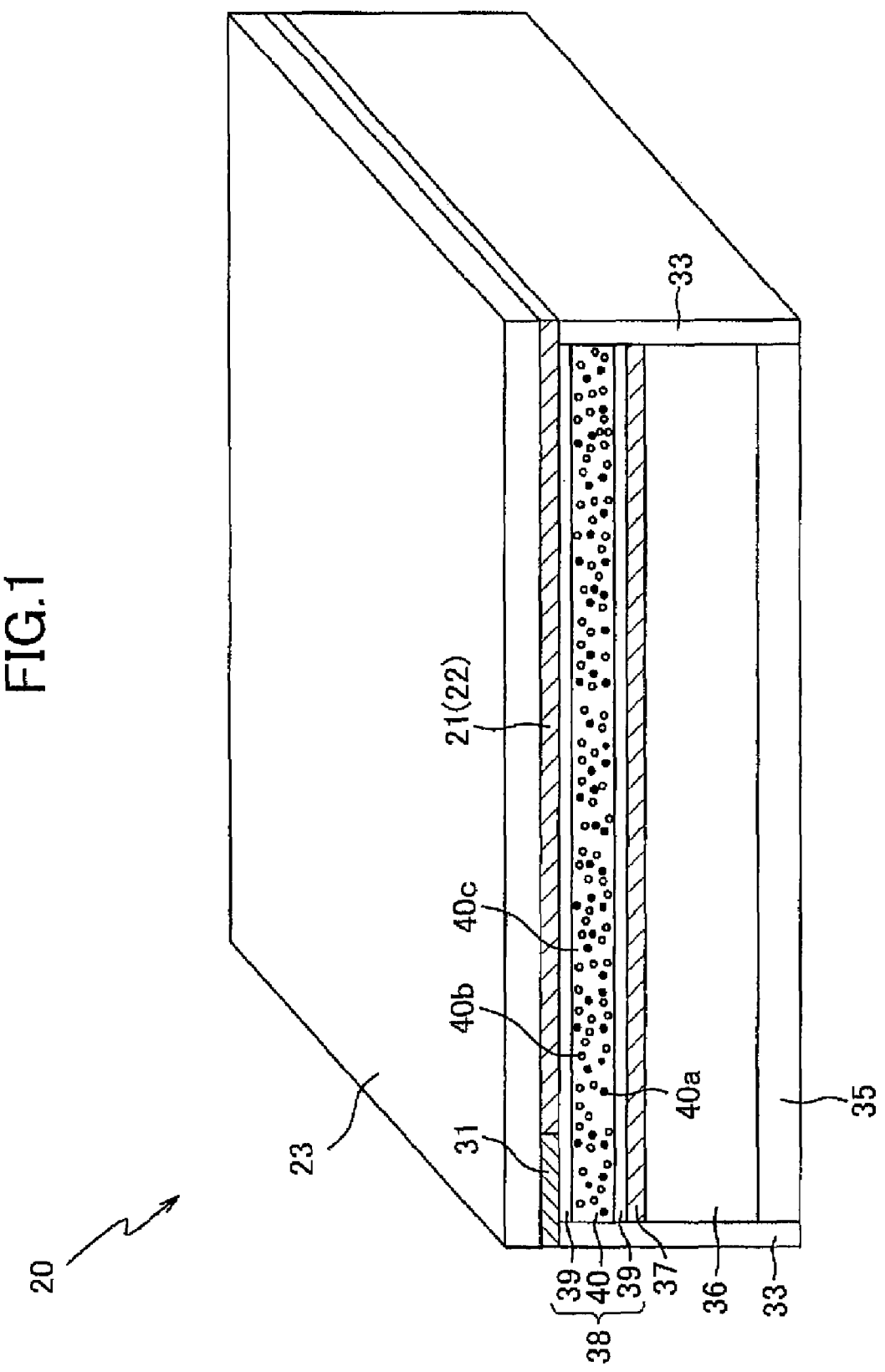
FIG. 1 is a perspective view showing a cross-section of a display medium according to a preferred embodiment of the present invention.
Figure 2:
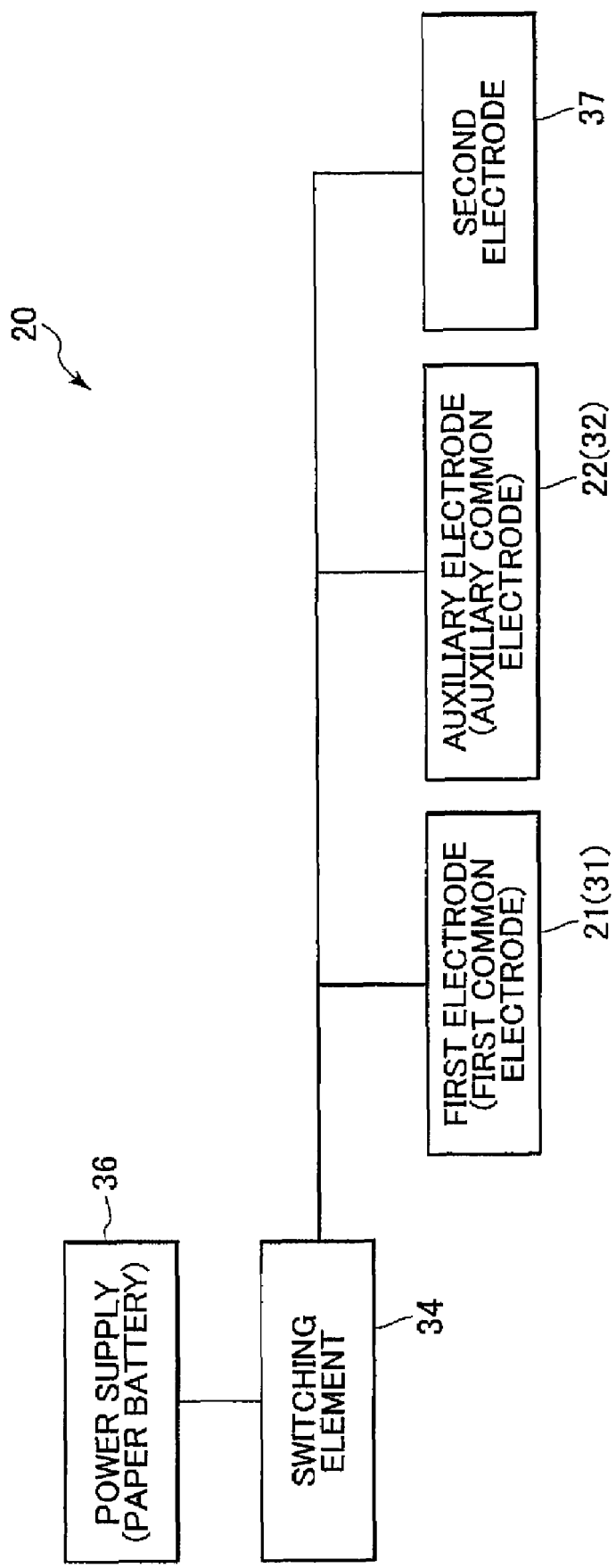
FIG. 2 is a block diagram showing a structure of the display medium in FIG. 1.

Next, a display medium 20 according to a preferred embodiment of the present invention will be described with reference to FIGS. 1 through 5. FIG. 1 is a perspective view showing a cross-section of the display medium 20 according to the preferred embodiment. FIG. 2 is a block diagram showing a structure of the display medium 20 in FIG. 1.

As shown in FIG. 1, the display medium 20 of the present invention includes a first substrate 23, a second substrate 35, an electrophoretic layer 38, a sealing member 33, a first electrode 21, an auxiliary electrode 22, and a second electrode 37. The first substrate 23 is transparent and constitutes a display surface. The second substrate 35 is formed of PET (polyethylene teraphthalate) or the like and opposes an underside surface of the first substrate 23 with a prescribed gap formed therebetween. The electrophoretic layer 38 is disposed in the gap between the substrates 23 and 35. The sealing material 33 is formed around an outer periphery of the display medium 20 for sealing the electrophoretic layer 38. The first electrode 21 is disposed between the first substrate 23 and the electrophoretic layer 38 and has a prescribed electrode pattern conforming to shape of text or image. The auxiliary electrode 22 is also disposed between the first substrate 23 and electrophoretic layer 38 so as to encompass the electrode pattern of the first electrode 21. The second electrode 37 is disposed between the second substrate 35 and electrophoretic layer 38.

The gap formed between the first substrate 23 and the second substrate 35 is approximately 100 μm, for example. The electrophoretic layer 38 is also configured of two electrode protective layers 39 and a liquid layer 40. The electrode protective layers 39 are positioned adjacent to the first electrode 21 and the second electrode 37, respectively. The liquid layer 40 has a dispersion liquid 40c in which are dispersed a plurality of black and white charged particles 40a and 40b. The black charged particles 40a are charged with a negative polarity, while the white charged particles 40b are positively charged.

As shown in FIG. 2, the display medium 20 further includes a switching element 34, a paper battery 36 serving as a drive source, a first common electrode 31, and an auxiliary common electrode 32. The first common electrode 31 is connected to the switching element 34 for supplying power from the paper battery 36 to the first electrode 21. Similarly, the auxiliary common electrode 32 is connected to the switching element 34 in order to supply power from the paper battery 36 to the auxiliary electrode 22.

Figure 3:
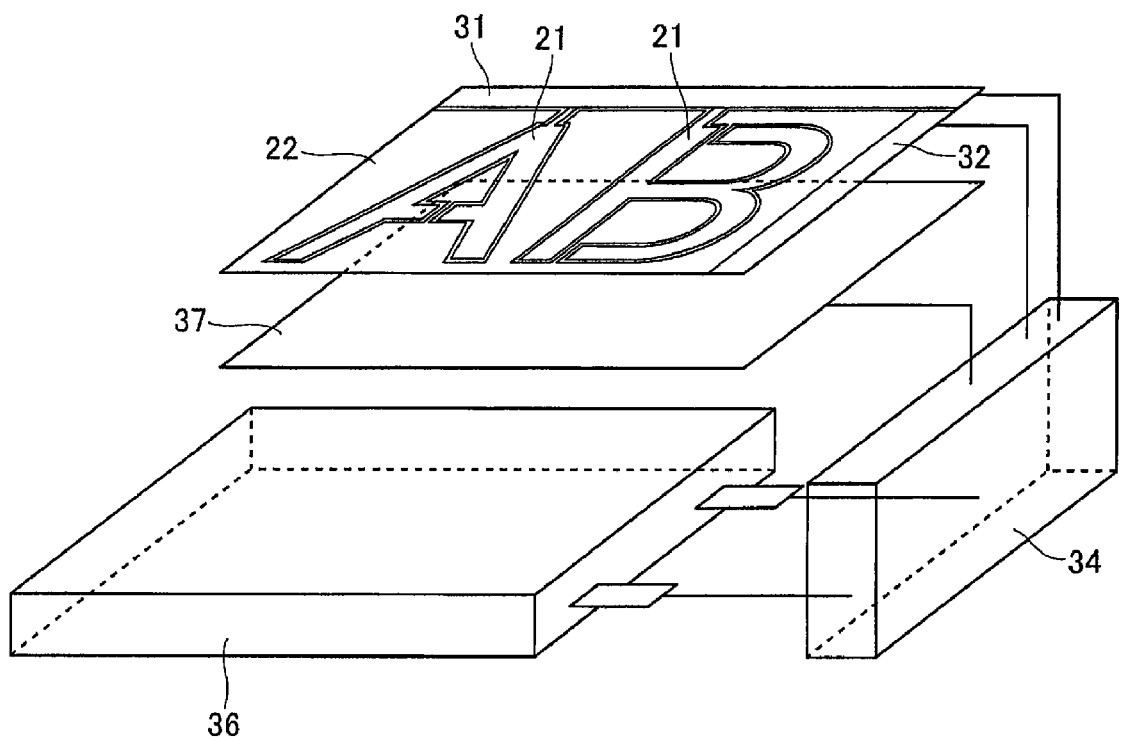
FIG. 3 shows electrically connected state of a paper battery, a switching element, a first common electrode, an auxiliary common electrode, and a second electrode according to the preferred embodiment of the present invention.

FIG. 3 illustrates an electrical connections among the paper battery 36, switching element 34, first common electrode 31, auxiliary common electrode 32, and second electrode 37. As shown in FIG. 3, the first common electrode 31 and first electrode 21 are integrally and electrically connected, while the auxiliary common electrode 32 and auxiliary electrode 22 are also integrally and electrically connected. Therefore, the paper battery 36 can supply power to each of the first electrode 21 and auxiliary electrode 22 via the first common electrode 31 and auxiliary common electrode 32. Further, the auxiliary common electrode 32 and auxiliary electrode 22 are not electrically connected to the first common electrode 31 and first electrode 21 since a gap is provided therebetween.

Figure 4:
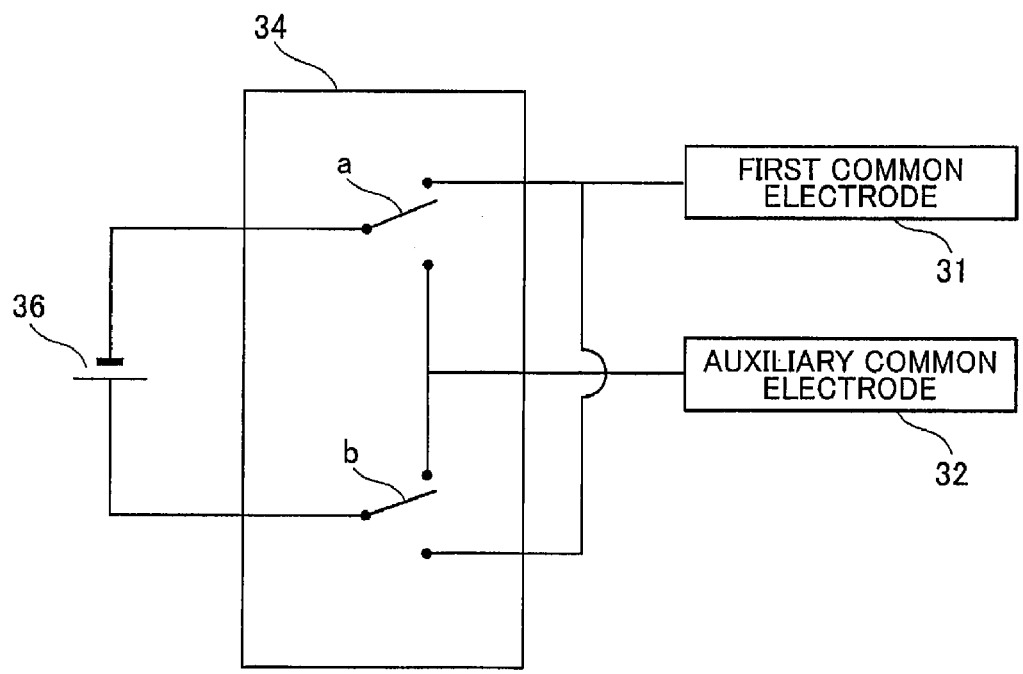
FIG. 4 illustrates operations of the switching element in FIG. 3.

The switching element 34 can also switch the power from the paper battery 36 so as to apply voltages to the first electrode 21 and auxiliary electrode 22 producing differing directions of electric fields relative to the second electrode 37. FIG. 4 illustrates operations of the switching element 34. Contacts a and b provided inside the switching element 34 operate associatively. Therefore, this construction can reverse the polarity of the first common electrode 31 and auxiliary common electrode 32 by associatively operating the contacts a and b.

With the display medium 20 of the preferred embodiment, the switching element 34 can apply voltages such that the first electrode 21 is positive relative to the second electrode 37 and the auxiliary electrode 22 is negative relative to the second electrode 37. Consequently, in regions of the electrophoretic layer 38 contacting the first electrode 21, the negatively charged black particles 40a move toward the first electrode 21 side, while the positively charged white particles 40b move toward the second electrode 37 side so that the black color of the negatively charged black particles 40a appears through the display surface. However, in regions of the electrophoretic layer 38 contacting the auxiliary electrode 22, the positively charged white particles 40b move to the first electrode 21 side, while the negatively charged black particles 40a move to the second electrode 37 side so that white appears through the display surface.

Figure 5:
FIG. 5 is a plan view of the display medium in FIG. 1 from a display surface side.

FIG. 5 is a plan view of the display medium 20 from the display surface (first substrate 23) side. As shown in FIG. 5, the display surface configured of the first substrate 23 appears black in regions correspond to the first electrode 21 and first common electrode 31 and white in all other regions. Hence, text or image corresponding to the shape of the first substrate 23 can be displayed with high clarity. The switching element 34 can also clear the displayed image by applying the same voltage to the first electrode 21 and auxiliary electrode 22 relative to the second electrode 37 so that substantially the entire display surface appears in white or black.

Next, a display medium manufacturing apparatus 1 for manufacturing the display medium 20 according to the preferred embodiment will be described with reference to FIGS. 6 through 8. The display medium manufacturing apparatus 1 determines an electrode pattern based on image data for desired text or image, forms the first electrode 21 and auxiliary electrode 22 corresponding to this electrode pattern on an electrophoretic tape 30 described later using a printer 100, and subsequently fixes the electrophoretic tape 30 to the first substrate 23 described later for easily producing the display medium 20 for displaying the desired text or image according to the user's specification.

Figure 6:
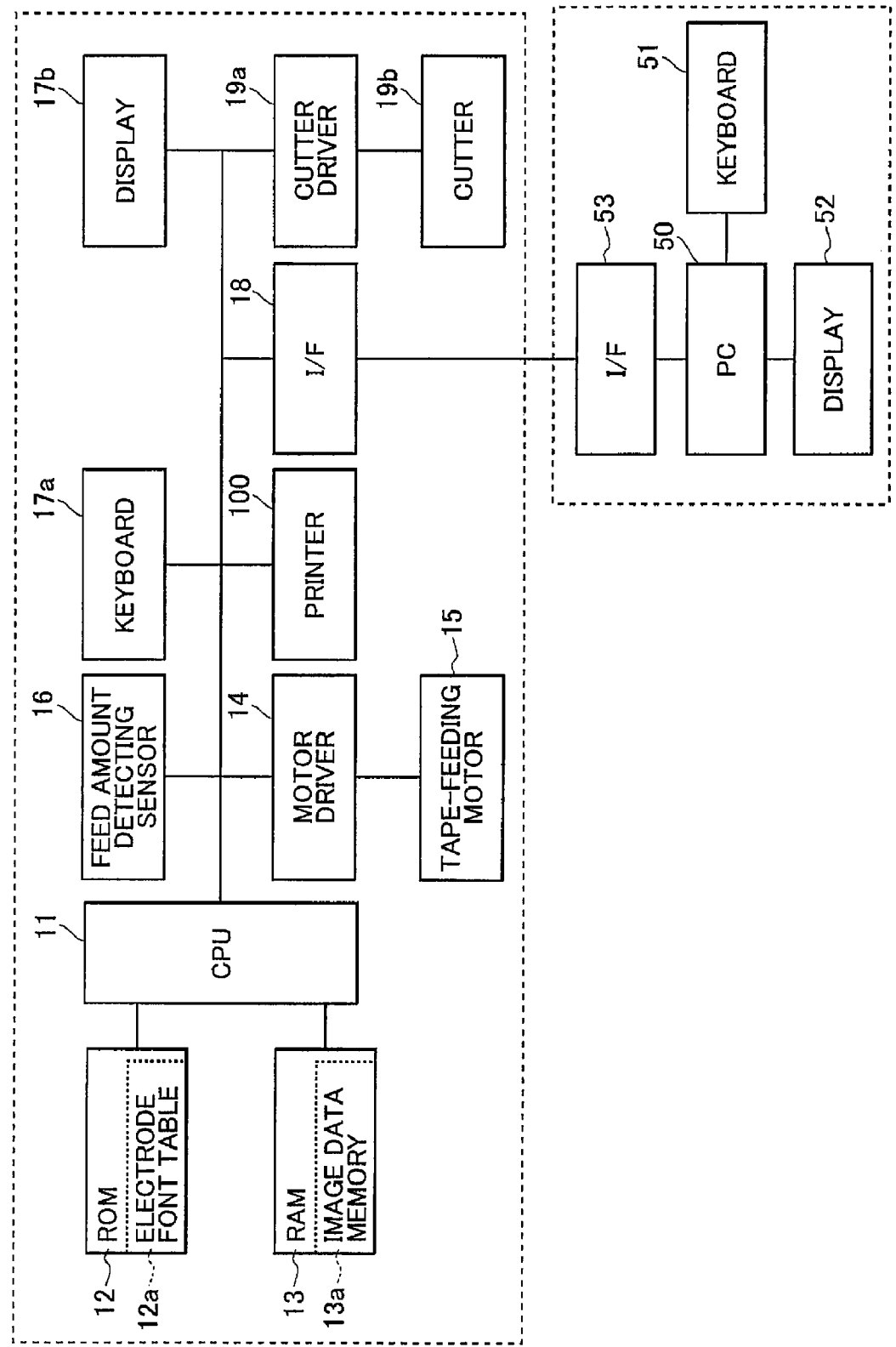
FIG. 6 is a block diagram showing the structure of an apparatus for manufacturing a display medium according to the preferred embodiment of the present invention and a personal computer connected to the apparatus for manufacturing a display medium.
Figure 7:
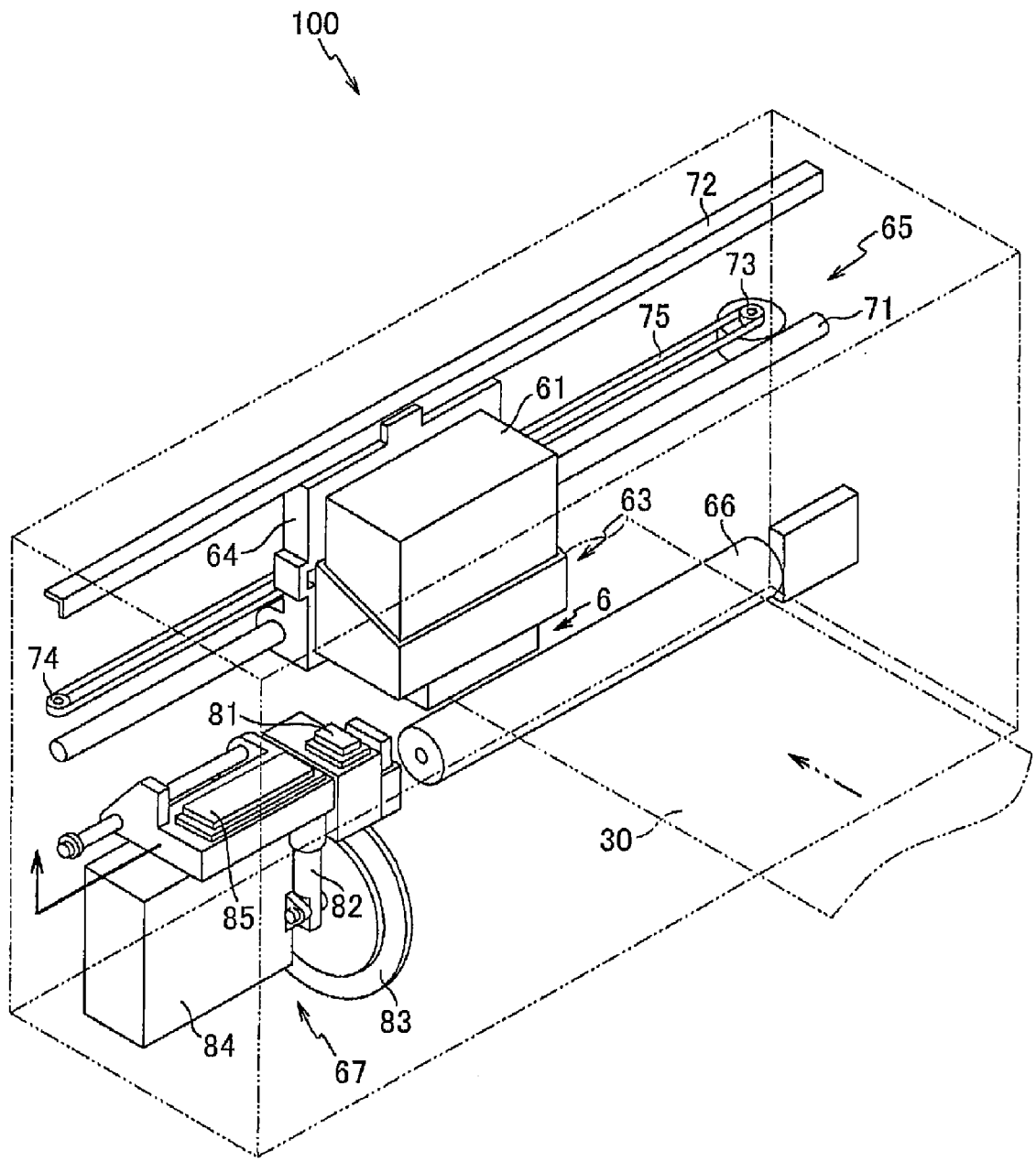
FIG. 7 is a perspective view showing a printer constituting a principle part of the apparatus for manufacturing a display medium according to the preferred embodiment.

As shown in FIG. 6, the display medium manufacturing apparatus 1 includes a CPU 11, a ROM 12, a RAM 13, a motor driver 14, a tape-feeding motor 15, a feed amount detecting sensor 16, a keyboard 17a, a display 17b, an interface 18 (I/F 18), a cutter driver 19a, a cutter 19b, and the printer 100. A personal computer 50 is connected to the display medium manufacturing apparatus 1. As shown in FIG. 8, the display medium manufacturing apparatus 1 also includes a first roll 151, a second roll 152, and pressure rollers 153.

First, the structure of the printer 100 will be described. As shown in FIG. 7, the printer 100 includes an ink cartridge 61, a head unit 63, a carriage 64, a drive unit 65, a platen roller 66, and a purge unit 67. The ink cartridge 61 is filled with ink configured of an electrode material. The head unit 63 includes a piezoelectric inkjet head 6 for printing on the electrophoretic tape 30. The ink cartridge 61 and head unit 63 are mounted on the carriage 64. The drive unit 65 reciprocates the carriage 64 linearly. The platen roller 66 extends in a reciprocating direction of the carriage 64 at a position opposing the inkjet head 6.

The drive unit 65 includes a carriage shaft 71, a guide plate 72, pulleys 73 and 74, and an endless belt 75. The carriage shaft 71 is disposed in a lower edge of the carriage 64 and extends parallel to the platen roller 66. The carriage 64 is supported on the carriage shaft 71 so as to be capable of reciprocating along the carriage shaft 71. The guide plate 72 is disposed on an upper edge of the carriage 64 and extends parallel to the carriage shaft 71. The inkjet head 6 is disposed on a bottom of the carriage 64. The pulleys 73 and 74 are disposed between the carriage shaft 71 and guide plate 72 and positioned at both ends of the carriage shaft 71. The endless belt 75 is looped around the pulleys 73 and 74 and joined to the carriage 64.

When a motor drives the pulley 73 to rotate forward or in reverse, the carriage 64 joined with the endless belt 75 reciprocates linearly along the carriage shaft 71 and guide plate 72 with the forward or reverse rotation of the pulley 73.

The electrophoretic tape 30 is fed from the first roll 151 disposed in one side of the printer 100 (FIG. 8) and is introduced between the inkjet head 6 and platen roller 66. The inkjet head 6 ejects ink to print prescribed patterns on the electrophoretic tape 30.

The purge unit 67 is disposed to one side of the platen roller 66 at a position opposing the inkjet head 6 when the head unit 63 is in a reset position (a position in which the inkjet head 6 does not oppose the platen roller 66). The purge unit 67 includes a purge cap 81, a pump 82, a cam 83, and an ink reservoir 84. The purge cap 81 is capable of contacting a nozzle surface of the inkjet head 6 so as to cover the plurality of nozzles described later formed therein.

When the head unit 63 is in the reset position, the purge cap 81 of the purge unit 67 covers the nozzles formed in the inkjet head 6. At this time, the cam 83 drives the pump 82 to draw out defective ink containing air bubbles and the like that has accumulated in the inkjet head 6. In this way, the purge unit 67 can prevent ejection problems caused by accumulated ink, air bubbles developed in the ink, and the like when the ink is initially introduced. The defective ink drawn out of the inkjet head 6 is stored in the ink reservoir 84.

A cap 85 is provided for covering the plurality of nozzles (not shown) formed in the inkjet head 6 when the inkjet head 6 is returned to the reset position after completing a printing operation in order to prevent ink from drying in the nozzles.

Figure 8:
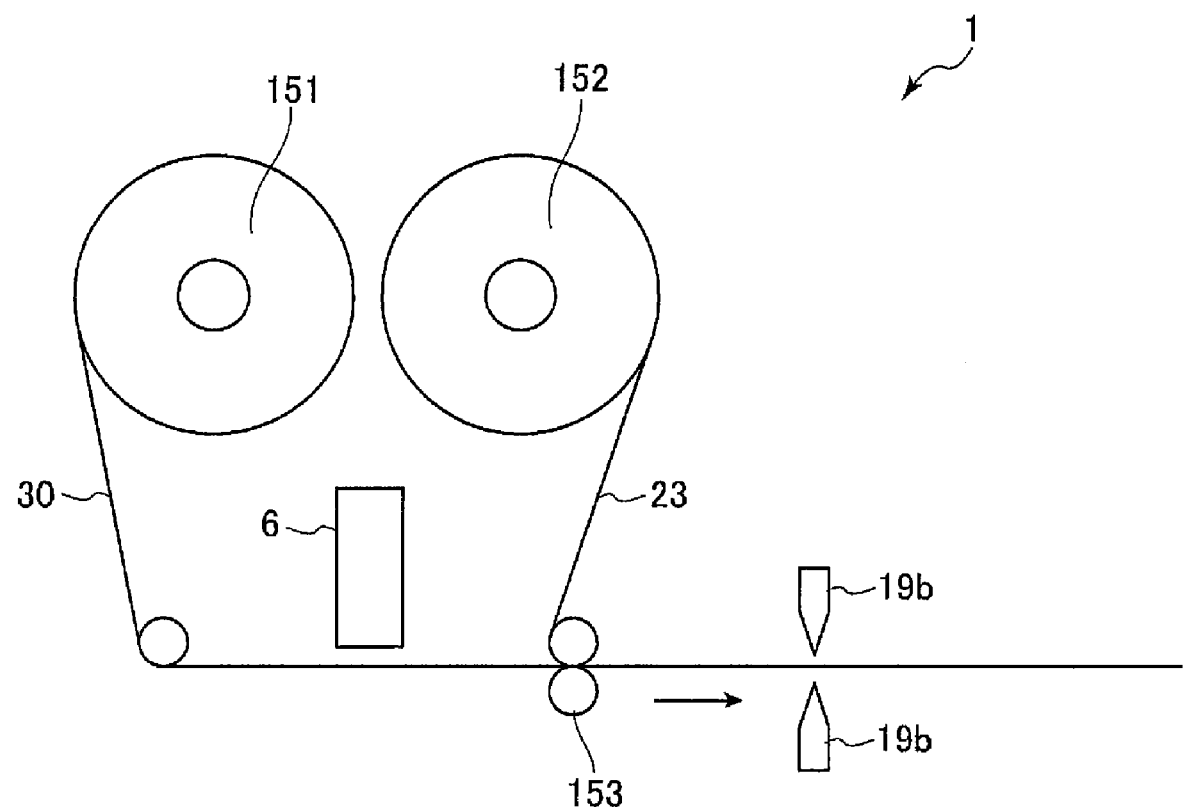
FIG. 8 illustrates general process of manufacturing a display medium on the apparatus for manufacturing a display medium according to the preferred embodiment of the present invention.

As shown in FIG. 8, the electrophoretic tape 30 is wound around the first roll 151. The first substrate 23 having substantially the same width as the electrophoretic tape 30 is wound around the second roll 152. The pressure rollers 153 function to press and adhesively fix together the electrophoretic tape 30 and first substrate 23 after the inkjet head 6 has performed a prescribed printing operation on the electrophoretic tape 30, while conveying the electrophoretic tape 30 and first substrate 23 in the direction of the arrow shown in FIG. 8. The first roll 151, second roll 152, and pressure rollers 153 are rotatably disposed on respective shafts. The first roll 151 and second roll 152 are detachably mounted. The first substrate 23 is formed of a transparent film, such as PET (polyethylene terephthalate). The first substrate 23 also includes an adhesive layer (not shown) laminated together with a release paper (not shown). The first substrate 23 is wound about the second roll 152 with the release paper side facing radially inward.

In the display medium manufacturing apparatus 1 shown in FIG. 6, the CPU 11, ROM 12, and RAM 13 are connected to the motor driver 14, feed amount detecting sensor 16, keyboard 17a, display 17b, I/F 18, cutter driver 19a, and printer 100 via a bus.

The CPU 11 is a central processing unit that controls overall operations of the display medium manufacturing apparatus 1 and executes various programs. The ROM 12 is a nonvolatile memory for storing the various programs executed by the CPU 11 and fixed data. The ROM 12 also includes an electrode font table 12a. The electrode font table 12a stores a correlation of characters and electrode patterns. The RAM 13 temporarily stores data and programs required in various processes executed by the CPU 11. The RAM 13 also includes an image data memory 13a.

The image data memory 13a serves to store image data for text and image. For example, the image data memory 13a may store image data received from an external device, such as the personal computer 50, connected to the display medium manufacturing apparatus 1 via the I/F 18.

The motor driver 14 functions to control the tape-feeding motor 15. The tape-feeding motor 15 is a pulse motor that drives gears (not shown) for rotating a take-up roller (not shown) for reeling off the electrophoretic tape 30 from the first roll 151, a take-up roller (not shown) for reeling off the first substrate 23 from the second roll 152, and the pressure rollers 153 for pressing and fixing together the electrophoretic tape 30 and first substrate 23.

The feed amount detecting sensor 16 detects amount of electrophoretic tape 30 fed by the tape-feeding motor 15. The I/F 18 forms a wired or wireless connection between the display medium manufacturing apparatus 1 and the personal computer 50 or other external device and controls the exchange of data between the display medium manufacturing apparatus 1 and the personal computer 50 or other external device.

The cutter driver 19a functions to drive the cutter 19b. The cutter 19b cuts the electrophoretic tape 30 and first substrate 23 fixed together by the first rolls 151 in a thickness direction thereof as needed to produce a desired length corresponding to the display medium 20 (FIG. 1).

The personal computer 50 includes a keyboard 51 for inputting data or commands to the personal computer 50, a display 52, and an interface 53 (I/F 53) for forming a wired or wireless connection with the display medium manufacturing apparatus 1.

The I/F 53 is linked to the I/F 18 of the display medium manufacturing apparatus 1 through a wired connection, such as a cable, or a wireless connection, such as Bluetooth (registered trademark) or infrared. Through this connection, the personal computer 50 can transmit image data to the display medium manufacturing apparatus 1.

Next, the electrophoretic tape 30 wound around the first roll 151 will be described. FIG. 9A is a plan view of the electrophoretic tape 30 from the top surface (surface on which the first electrode 21 and auxiliary electrode 22 are printed) side. FIG. 9B is a cross-sectional view of the electrophoretic tape 30 along the line B-B in FIG. 9A. Excluding the first substrate 23, first electrode 21, and auxiliary electrode 22 of the display medium 20 described above, the electrophoretic tape 30 has the same structure as the display medium 20 and is a single integrated unit with a continuous shape. The electrophoretic tape 30 is integrally configured of the second substrate 35, paper battery 36, second electrode 37, and electrophoretic layer 38.

As shown in FIG. 9A, the first common electrode 31 and auxiliary common electrode 32 are printed on the top surface side of the electrophoretic tape 30. The first common electrode 31 extends in a longitudinal direction of the electrophoretic tape 30 along one edge. The auxiliary common electrode 32 is provided at prescribed intervals in the longitudinal direction of the electrophoretic tape 30 and extends substantially orthogonal to the first common electrode 31 with a gap formed therebetween. The first common electrode 31 and auxiliary common electrode 32 have been omitted from the drawing in FIG. 9A. The electrophoretic tape 30 is also divided at prescribed intervals in the longitudinal direction by the sealing material 33, with the sealing material 33 surrounding the outer peripheral of each divided unit. At least one switching element 34 is provided for each unit divided by the sealing material 33.

Next, a method of manufacturing the display medium 20 will be described with reference to FIGS. 10 through 12 and FIG. 1. This manufacturing method includes (1) an electrode pattern generating step, (2) an electrode forming step, and (3) a bonding step for forming the display medium 20. The display medium 20 is manufactured using the display medium manufacturing apparatus 1 described above.

In the electrode pattern generating step, the CPU 11 executes following process based on a prescribed program stored on the ROM 12 to generate an electrode pattern corresponding to desired image data.

Figure 10:
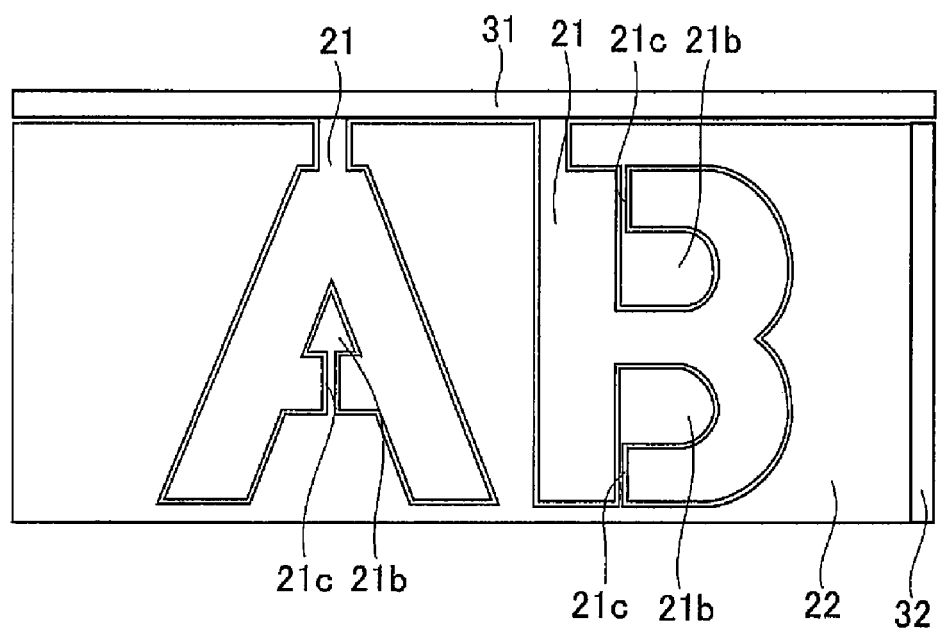
FIG. 10 shows the first electrode and auxiliary electrode formed on the electrophoretic tape based on an electrode pattern according to the preferred embodiment of the present invention.

Here, "electrode pattern" signifies regions in which the first electrode 21 or auxiliary electrode 22 are to be provided. FIG. 10 shows the first electrode 21 and auxiliary electrode 22 formed on the electrophoretic tape 30 based on this electrode pattern. As shown in FIG. 10, the first electrode 21 is provided in regions for displaying desired text or image. The auxiliary electrode 22 is provided in regions that are to be non-displaying regions in order that the desired text or image can be seen.

Figure 11A:
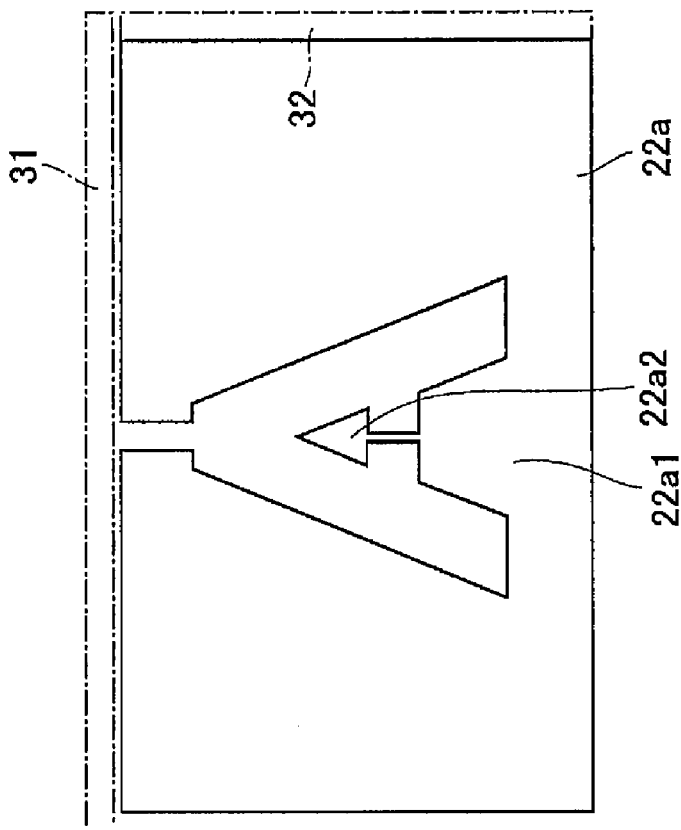
FIG. 11A shows a pattern stored in an electrode font table corresponding to a character "A" according to the preferred embodiment of the present invention.

In the electrode pattern generating step, the CPU 11 determines a pattern 21a of the first electrode 21 by referencing the electrode font table 12a based on image data stored in the image data memory 13a (FIG. 6). This method enables the display medium manufacturing apparatus 1 to easily generate an electrode pattern corresponding to each character. FIG. 11A shows the pattern 21a stored in the electrode font table 12a in association with the character "A". As shown in FIG. 11A, the pattern 21a of the first electrode 21 stored in the electrode font table 12a is a character shaped with one part extending toward an connecting with the first common electrode 31 provided along the one edge of the electrophoretic tape 30. The character is shaped so that an enclosed region 21b in the character is in communication with the region outside the character.

Figure 11B:
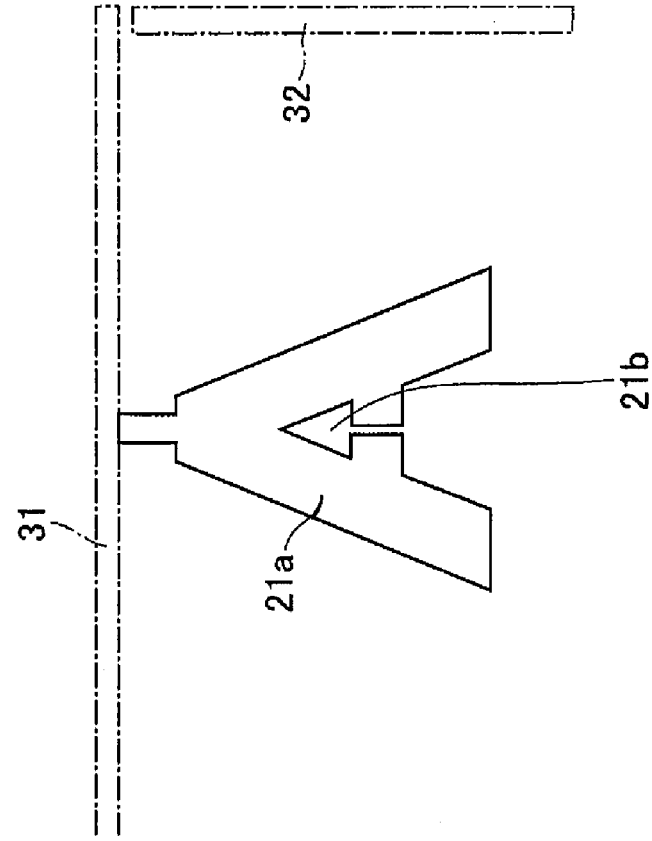
FIG. 11B shows a pattern of the auxiliary electrode according to the preferred embodiment of the present invention.

Next, the CPU 11 determines a pattern 22a of the auxiliary electrode 22. FIG. 11B shows the pattern 22a of the auxiliary electrode 22. As shown in FIG. 11B, the pattern 22a is formed with a region 22a 1 surrounding the pattern 21a of the first electrode 21 connected to a region 22a 2 corresponding to the enclosed region in the character. The pattern 22a is also connected to the auxiliary common electrodes 32 provided at prescribed intervals on the electrophoretic tape 30. The CPU 11 sets the pattern 22a, which separates a prescribed interval between the pattern 21a of the first electrode 21 and the first common electrode 31 based on the pattern 21a.

The pattern 21a of the first electrode 21 and the pattern 22a of the auxiliary electrode 22 are combined and produced as an electrode pattern. Next, the first electrode 21 and auxiliary electrode 22 formed according to the electrode pattern produced in the electrode pattern generating step will be described while referring again to FIG. 10.

As shown in FIG. 10, the first electrode 21 includes a plurality of independent regions "A" and "B" constituting a character array "AB". The regions of the first electrode 21 are electrically connected as a unit via the first common electrode 31 provided on the one edge of the electrophoretic tape 30.

The first electrode 21 including each region "A" and "B" is formed with communicating parts 21c as parts of the enclosed region 21b for electrically connecting the auxiliary electrode 22 provided in the enclosed region 21b with the auxiliary electrode 22 surrounding the regions of the first electrode 21. Since the auxiliary electrode 22 forms a prescribed gap between the first electrode 21 and first common electrode 31, the auxiliary electrode 22 is not electrically connected to the first electrode 21 and the first common electrode 31.

Here, the "plurality of independent regions" is not limited to individual characters constituting a character array, but may also be separated independent components constituting each character or separated independent components included in an image.

Figure 12A:
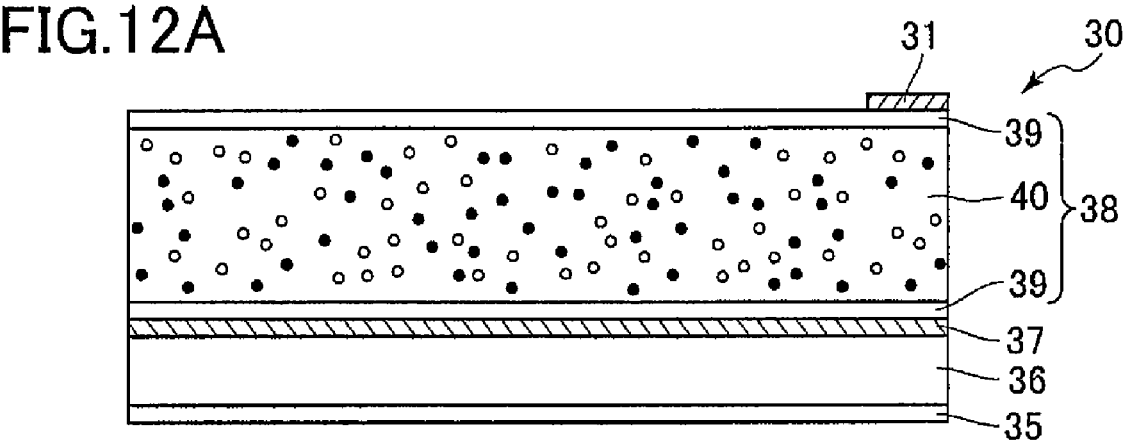
FIGS. 12A-12C include cross-sectional views of the display medium showing an example of an electrode forming step and a laminating step in the manufacturing method according to the preferred embodiment of the present invention.

Next, the electrode forming step and the bonding step will be described. FIG. 12A is a cross-sectional view of the electrophoretic tape 30. As shown in FIG. 12A, the first common electrode 31 and auxiliary common electrode 32 are provided on a surface of the electrophoretic tape 30 (the surface on which the first electrode 21 and auxiliary electrode 22 are printed). For the sake of description, the auxiliary common electrode 32 is not included in FIGS. 12A-12C.

Figure 12B:
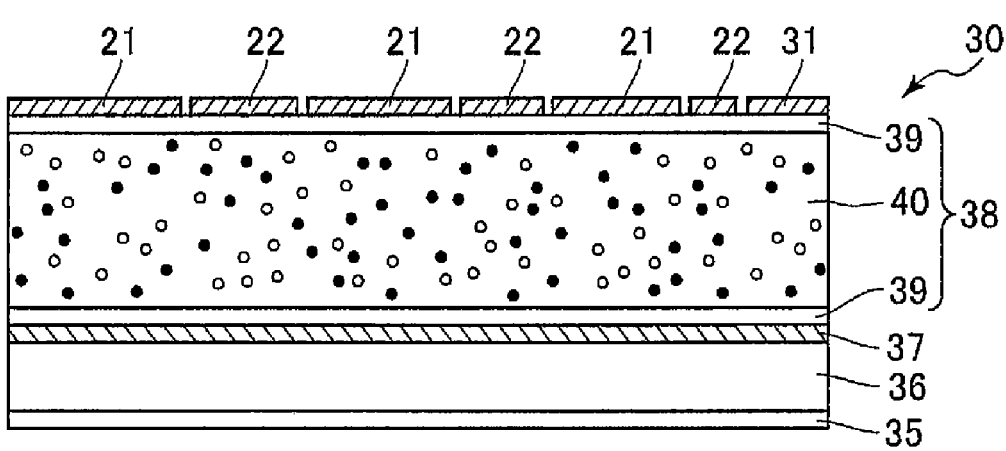

FIG. 12B illustrates the electrode forming step. As shown in FIG. 12B, the first electrodes 21 and auxiliary electrodes 22 are formed on the electrophoretic tape 30 in the electrode forming step. Specifically, the CPU 11 (FIG. 6) of the display medium manufacturing apparatus 1 controls the printer 100 based on the electrode pattern generated in the electrode pattern generating step to form the electrodes 21 and 22 by ejecting ink formed of an electrode material from the inkjet head 6 (FIG. 7) of the printer 100. Here, the electrodes 21 and 22 are formed of the same material but are not connected due to gaps formed therebetween.

Here, "ink formed of an electrode material" is preferably manufactured using a conductive polymer that can be dispersed in a medium or that is soluble. Suitable examples of the conductive polymer are a conducting polypyrrole polymer and a conducting polythiophene polymer. A suitable solvent for dispersing or dissolving the conducting polymer is water, alcohol, or a mixture of water and alcohol. One example of a solution suitable for use in the display medium manufacturing apparatus 1 of the preferred embodiment for forming electrodes is Denatron P-502RG (Nagase Chemtex Corporation).

Figure 12C:
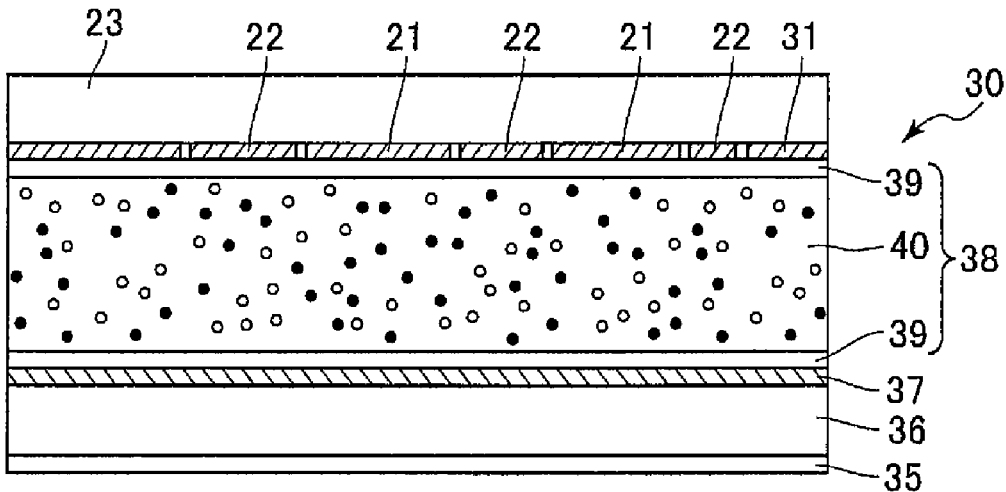

FIG. 12C illustrates the bonding step. As shown in FIG. 12C, in the bonding step the first substrate 23 is bonded on the surface of the electrophoretic tape 30 having the electrodes 21 and 22 formed in the electrode forming step so that the first substrate 23 is fixed to the electrophoretic tape 30. As described above, the first substrate 23 has a layered structure including an adhesive layer (not shown) and a release paper (not shown). The display medium manufacturing apparatus 1 bonds the first substrate 23 to the electrophoretic tape 30 by first peeling off the release paper of the first substrate 23 to expose the adhesive layer, and subsequently bonding the first substrate 23 on the electrophoretic tape 30 and pressing the two together with the pressure rollers 153 (FIG. 8).

Next, the cutter 19b (FIG. 8) cuts the electrophoretic tape 30 and first substrate 23 at a position corresponding to the sealing material 33, thereby dividing the electrophoretic tape 30 and first substrate 23 into individual display media 20. In this way, it is not necessary to provide a special step for sealing the electrophoretic layer 38.

With the display medium manufacturing apparatus 1 and the method of manufacturing the display medium 20 according to the preferred embodiment, the image data memory 13a stores image data for text or image to be displayed on the display medium 20. When the text or image are configured of a plurality of independent parts, an electrode pattern is generated for electrically connecting electrodes corresponding to these parts, and the first electrodes 21 and auxiliary electrodes 22 are formed on the electrophoretic tape 30 based on this electrode pattern. After forming the first electrodes 21 and auxiliary electrodes 22 on the electrophoretic tape 30, the first substrate 23 is bonded on the electrophoretic tape 30. Accordingly, the formation of the electrically connected first electrodes 21 and auxiliary electrodes 22 corresponding to parts of the characters or image to be displayed on the display medium 20 is simplified, thereby simplifying the production of the display medium 20 capable of displaying desired text and image corresponding to the shape of the first electrodes 21.

Further, the display medium manufacturing apparatus 1 and the manufacturing method of the preferred embodiment facilitate the production of a display medium 20 for displaying desired text and image by using the electrophoretic tape 30 provided with the switching element 34 and paper battery 36 that are electrically connected to the first common electrode 31 and auxiliary common electrode 32.

Further, the first common electrode 31 provided along one edge of the electrophoretic tape 30 in the longitudinal direction can supply electricity to all of the first electrodes 21, regardless of the shape of text or image to be displayed on the display medium 20, and facilitates wiring during manufacturing of the display medium 20 for supplying electricity to the first electrodes 21. Forming the first common electrode 31 along one edge prevents a drop in visibility of the displayed region on the display medium 20 corresponding to the shape of the first electrode 21.

Further, the auxiliary common electrodes 32 provided on the electrophoretic tape 30 can supply electricity to the auxiliary electrode 22, regardless of the shape of text or image to be displayed on the display medium 20, thereby simplifying the wiring for supplying electricity to the auxiliary electrode 22. Further, since the display medium manufacturing apparatus 1 of the preferred embodiment includes the printer 100 having the piezoelectric inkjet head 6, the electrodes 21 and 22 can be formed with accuracy based on the generated electrode pattern.

While the invention has been described in detail with reference to specific embodiments thereof, it would be apparent to those skilled in the art that many modifications and variations may be made therein without departing from the spirit of the invention, the scope of which is defined by the attached claims.

For example, the display medium manufacturing apparatus 1 and method of manufacturing the display medium 20 according to the preferred embodiment form the electrodes 21 and 22 using an inkjet type printer 100. However, it is also possible to use a thermal transfer printer having a thermal transfer head 60 (FIG. 13).

FIG. 13 shows the general structure of a display medium manufacturing apparatus 2 for manufacturing the display medium 20. The display medium manufacturing apparatus 2 has a thermal transfer printer in place of the inkjet printer 100 provided in the display medium manufacturing apparatus 1 of FIG. 8. Components of the display medium manufacturing apparatus 2 identical to those in the display medium manufacturing apparatus 1 have been designated with the same reference numerals to avoid duplicating description.

As shown in FIG. 13, the display medium manufacturing apparatus 2 includes a first roll 154, a second roll 155, a third roll 157, and a take-up roll 158. The first roll 154 is detachably mounted in the display medium manufacturing apparatus 2. The electrophoretic tape 30 is wound around the first roll 154. The second roll 155 is also detachably mounted in the display medium manufacturing apparatus 2. The first substrate 23 having substantially the same width as the electrophoretic tape 30 is wound around the second roll 155. A thermal transfer film 156 is wound around the third roll 157. The take-up roll 158 takes up the thermal transfer film 156. The first roll 154, second roll 155, third roll 157, and take-up roll 158 are rotatably provided on respective shafts. The electrophoretic tape 30 has a layered construction including an adhesive layer (not shown) formed on the surface that is fixed to the first substrate 23, and a release paper (not shown) adjacent to the adhesive layer. The electrophoretic tape 30 is wound around the first roll 154 so that the release paper faces radially outward of the first roll 154. The first substrate 23 is wound around the second roll 155 so that the display surface side faces radially outward of the second roll 155.

The third roll 157 and take-up roll 158 are disposed on an undersurface side of the first substrate 23, that is, the surface to which the electrophoretic tape 30 is fixed. The thermal transfer head 60 provided in a printer presses against the thermal transfer film 156 wound around the third roll 157 so that the thermal transfer film 156 contacts the underside surface of the first substrate 23.

Figure 14:
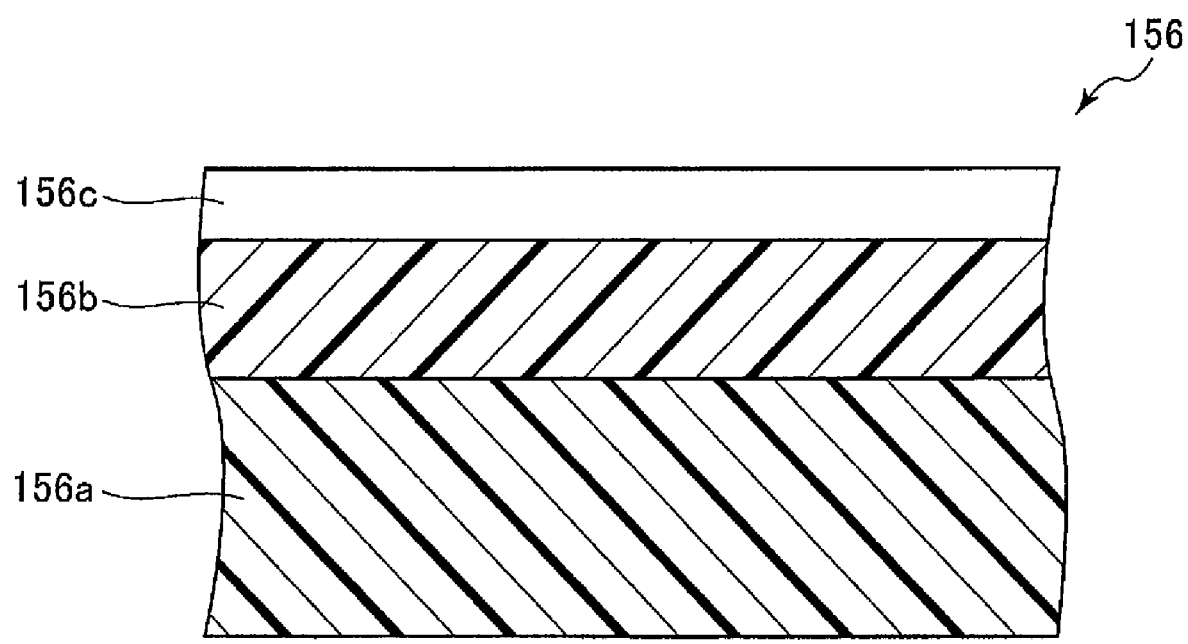
FIG. 14 is a cross-sectional view of a thermal transfer film according to the preferred embodiment of the present invention.

Next, the thermal transfer film 156 will be described with reference to FIG. 14. FIG. 14 is a cross-sectional view of the thermal transfer film 156. As shown in FIG. 14, the thermal transfer film 156 includes a base film 156a, a heat fusible resin layer 156b, and a conducting material-containing layer 156c. The base film 156a is a flexible resin film having resistance to heat. The heat fusible resin layer 156b is provided on one surface of the base film 156a and interposed between the base film 156a and the conducting material-containing layer 156c. A protective film formed of an insulating material may be provided on the surface of the conducting material-containing layer 156c for protecting the same.

The base film 156a is appropriately formed of polyethylene terephthalate, polyester, polyethylene, polypropylene, polystyrene, polyimide, polyvinyl alcohol, polyvinyl chloride, a fluorocarbon containing polyfluoroethylene or the like, nylon, or cellulose, for example. The heat fusible resin layer 156*b* may be formed of a paraffin wax or olefin wax having a high melting point, for example. Portions of the heat fusible resin layer 156*b* pressed and heated by the thermal transfer head 60 melt and separate from the base film 156*a* together with the conducting material-containing layer 156*c*.

The conducting material-containing layer 156*c* is formed by coating the heat fusible resin layer 156*b* with a paste-like composition containing conductive particles (a composition for forming a transparent electrode). The composition includes at least (a) conductive particles, (b) a bonding resin, and (c) a solvent. Subsequently, the coating is dried, and part or all of the solvent is removed.

The conductive particles may be a fine metal powder including gold, silver, iron, aluminum, or the like; indium oxide; tin oxide; indium tin oxide (ITO); antimony tin oxide (ATO); fluorine indium oxide (FIO); fluorine tin oxide (FTO); fluorine zinc oxide (FZO); or fine zinc oxide powder containing one or more types of metal selected from Al, Co, Fe, In, Sn, and Ti.

Next, steps in the process for forming electrodes with the display medium manufacturing apparatus 2 will be described. As shown in FIG. 13, the thermal transfer head 60 transfers the conducting material-containing layer 156*c* onto the first substrate 23 to form the first electrodes 21 (FIG. 15) and auxiliary electrodes 22 (FIG. 15). More specifically, the thermal transfer head 60 is driven based on an electrode pattern generated according to image data to press against the thermal transfer film 156 in prescribed regions, thereby melting the heat fusible resin layer 156*b* and transferring the conducting material-containing layer 156*c* in those regions onto the first substrate 23. After printing the electrodes 21 and 22 on the first substrate 23 in this way, the electrophoretic tape 30 unwound from the first roll 154 and having the release paper stripped off to expose the adhesive layer is bonded on and fixed to the surface of the first substrate 23 on which the electrodes are formed.

Figure 15A:
FIGS. 15A-15C include cross-sectional views of a display medium for illustrating examples of an electrode forming step and a laminating step in a manufacturing method implemented by the apparatus for manufacturing the display medium according to the preferred embodiment of the present invention.
Figure 15B:
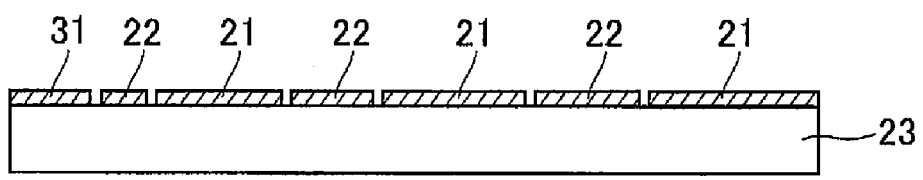
Figure 15C:
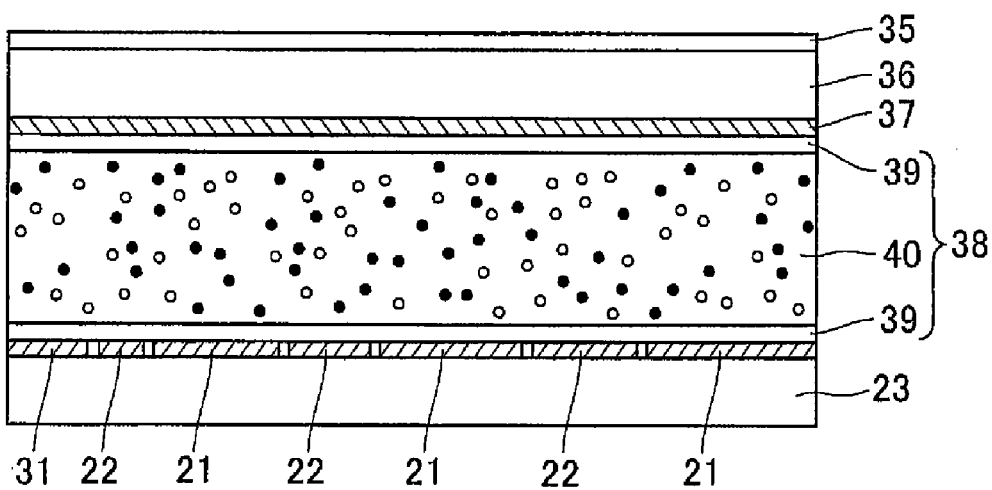

FIGS. 15A-15C illustrate in cross-sectional views examples of the electrode forming step and bonding step in the method of manufacturing the display medium 20 performed with the display medium manufacturing apparatus 2 of the preferred embodiment, and corresponds to the steps shown in FIGS. 12A-12C. In FIGS. 15A-15C, components identical to those in FIGS. 12A-12C have been designated with the same reference numerals to avoid duplicating description. Further, as in FIGS. 12A-12C, the auxiliary common electrode 32 has been omitted from FIGS. 15A-15C.

FIG. 15A is a cross-sectional view of the first substrate 23. The first common electrode 31 and auxiliary common electrode 32 are provided on the underside surface of the first substrate 23 (the surface on which the first electrode 31 and auxiliary electrode 32 are formed). As shown in FIG. 15B, the electrodes 21 and 22 are formed on the first substrate 23 to oppose the electrophoretic tape 30.

As shown in FIG. 15(*c*), the electrophoretic tape 30 and first substrate 23 are fixed together in the bonding step.

Since the display medium manufacturing apparatus 2 forms the electrodes 21 and 22 using a thermal transfer printer, the electrodes 21 and 22 are printed on the first substrate 23, rather than an electrophoretic tape 30 because heat generated from the thermal transfer head 60 may damage the electrophoretic layer 38 of the electrophoretic tape 30 when the thermal transfer head 60 is pressed against the electrophoretic tape 30. Accordingly, it is possible to avoid damaging the electrophoretic layer 38 of the electrophoretic tape 30. Further, since the display medium manufacturing apparatus 2 is provided with the thermal transfer head 60, the electrodes 21 and 22 can be formed with great precision based on the generated electrode pattern.

Further, when forming the electrodes 21 and 22 on the underside surface of the first substrate 23, an electrode pattern generating unit generates an electrode pattern corresponding to the text or image to be displayed on the display medium 20 in an orientation reversed left-to-right, that is, an electrode pattern corresponding to the mirror image of the text or image. Therefore, it is possible to print the electrodes 21 and 22 for a pattern having a normal left-to-right orientation and to display the text or image with a normal left-to-right orientation when viewing the display surface of the first substrate 23.

Figure 16:
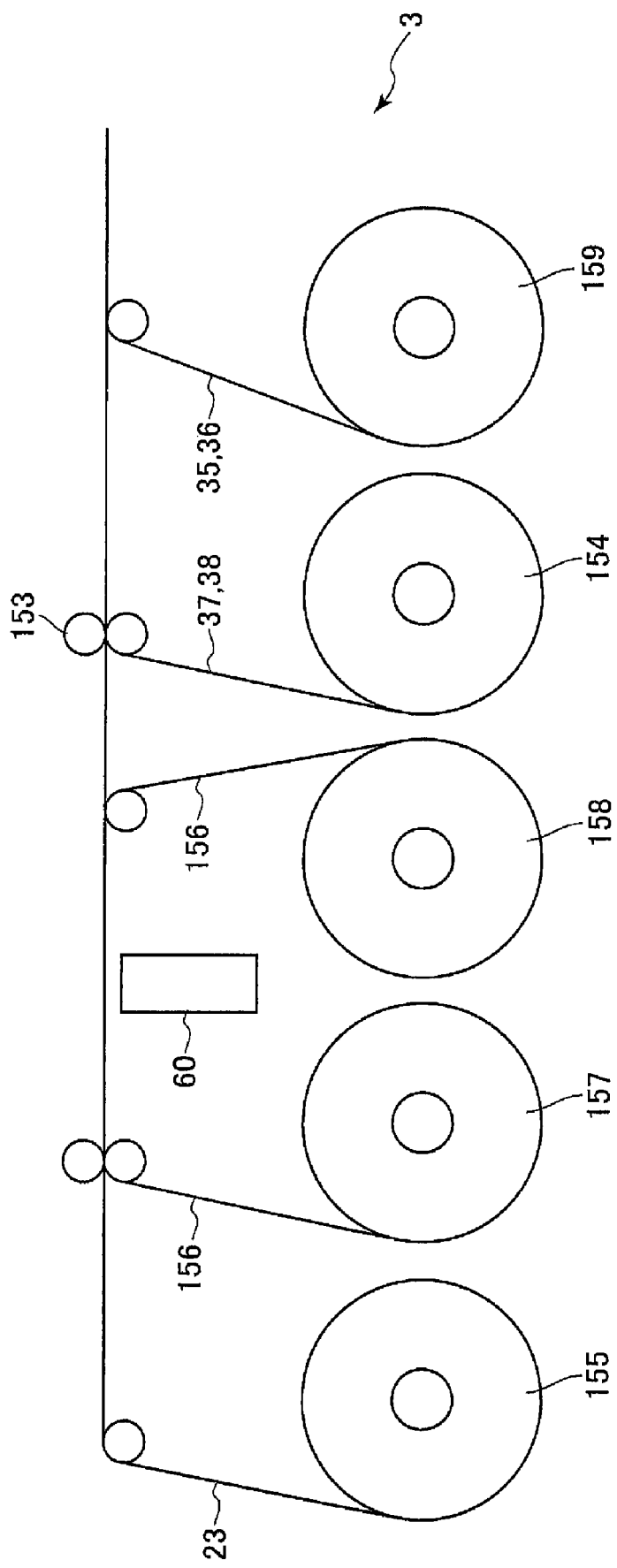
FIG. 16 illustrates a method of manufacturing the display medium executed by a apparatus for manufacturing the display medium according to the preferred embodiment having a thermal transfer printer.

Further, while the second substrate 35 and the paper battery 36 is provided on the electrophoretic tape 30 in the variation described above, it is also possible to provide the second substrate 35 and the paper battery 36 after fixing the first substrate 23 to the second electrode 37 and the electrophoretic layer 38 in the laminating step. FIG. 16 corresponds to FIG. 13 in the preferred embodiment described above and illustrates the general structure of a display medium manufacturing apparatus 3 having a thermal transfer printer for manufacturing the display medium 20. Components of the display medium manufacturing apparatus 3 that are identical to components in the display medium manufacturing apparatus 2 described above have been designated with the same reference numerals to avoid duplicating description.

As shown in FIG. 16, a fourth roll 159 is detachably mounted in the display medium manufacturing apparatus 3 and is capable of rotating about an axis. The second substrate 35 and the paper battery 36 are wound around the fourth roll 159. The second electrode 37 and the electrophoretic layer 38 have a layered structure including an adhesive layer (not shown) and a release paper (not shown) adjacent to the adhesive layer, both of which are provided on the surface to which the first substrate 23 is fixed and the surface to which the paper battery 36 is fixed.

After the display medium manufacturing apparatus 3 prints the first electrodes 21 and auxiliary electrodes 22 on the first substrate 23 with the thermal transfer head 60, the second electrode 37 and the electrophoretic layer 38 unwound from the first roll 154 and stripped of the release paper to expose the adhesive layer is laminated on and bonded to the surface of the first substrate 23 on which the electrodes are formed. Next, the release paper is stripped from the underside surface of the second electrode 37 and the electrophoretic layer 38 opposite the surface to which the first substrate 23 is fixed, and the second substrate 35 and the paper battery 36 unwound from the fourth roll 159 is fixed to the of the second electrode 37 and the electrophoretic layer 38.

Further, while the first electrodes 21 and auxiliary electrodes 22 are formed on the display medium 20 in the preferred embodiment described above, the auxiliary electrodes 22 are not essential. If the auxiliary electrodes 22 are not formed, then the electrode pattern of the first electrodes 21 is generated by the electrode pattern generating unit or in the electrode pattern generating step.

Further, the image data memory 13*a* stores text data as image data in the preferred embodiment. However, the image data memory 13*a* may store image data, such as data in the bitmap format, indicating graphics or pictures, for example. In such a case, it is possible to extract each independent region constituting the image, to form an electrode pattern in which at least part of each region extends to the one edge on which the first common electrode 31 is provided, and to electrically connect the first electrodes 21 corresponding to the each independent region.

Further, the display medium 20 manufactured according to the display medium manufacturing apparatus 1, 2, or 3 and the manufacturing method of the preferred embodiment is provided with the switching element 34 and paper battery 36, but these parts may be omitted. In such a case, the first electrodes 21 can still be integrally and electrically connected and can be shaped to extend to a one edge of the electrophoretic tape 30 or the first substrate 23. Accordingly, by connecting at least part of the first electrodes 21 to this edge, electricity can be supplied to all the first electrodes 21, regardless of the shape of the text or image to be displayed on the display medium 20, thereby facilitating the wiring for supplying electricity to the first electrodes 21.

Further, while the display medium manufacturing apparatus 1 has the first electrodes 21 and auxiliary electrodes 22 formed on the electrophoretic tape 30, but the first electrodes 21 and auxiliary electrodes 22 may be formed on the first substrate 23. Further, the first common electrode 31 and auxiliary common electrode 32 may be provided on the first substrate 23 instead of the electrophoretic tape 30.

With the display medium manufacturing apparatus 1, 2, or 3 and the manufacturing method of the preferred embodiment, the first common electrode 31 and auxiliary common electrode 32 are prepared on the electrophoretic tape 30 in advance. However, it is possible to generate an electrode pattern including the first common electrode 31 linked with the first electrodes 21 and the auxiliary common electrode 32 linked with the auxiliary electrodes 22 and to form the first common electrode 31 and auxiliary common electrode 32 together with the first electrodes 21 and auxiliary electrodes 22 based on the electrode pattern.

Further, while the first electrodes 21 are provided for each character constituting a character array and part of each character extends to the first common electrode 31 formed along one edge, it is also possible to integrally and electrically connect the first electrodes 21 by linking part of each character to a neighboring character and to extend part of the first electrodes 21 to the first common electrode 31. In other words, the first electrodes 21 provided for each of a plurality of regions constituting the text or image can be integrally and electrically connected to each other with at least one part electrically connected to the first common electrode 31.

Further, while the electrophoretic tape 30 or first substrate 23 have a laminated structure including an adhesive layer and a release paper, the release paper may be omitted.

The invention claimed is:

1. A manufacturing method for manufacturing a display medium, the display medium comprising a transparent first substrate that constitutes a display surface; a second substrate that opposes an underside surface side of the display surface of the first substrate and separates from the underside surface with a prescribed gap; an electrophoretic layer that is disposed in the prescribed gap and has a liquid in which a plurality of charged particles are dispersed; a first electrode that is disposed between the electrophoretic layer and the first substrate and has a prescribed shape; and a second electrode that is disposed between the electrophoretic layer and the second substrate, wherein voltage applied across the first electrode and the second electrode causes the charged particles in the electrophoretic layer to move toward either an area facing the first electrode or an area facing the second electrode for producing a display corresponding to the shape of the first electrode, the manufacturing method comprising:
generating an electrode pattern so that when image data for the text or image to be displayed on the display medium is configured of a plurality of independent regions, the electrode pattern has a plurality of integrally and electrically connected electrodes disposed in correspondence to the plurality of regions;
forming the first electrode on either the electrophoretic medium integrally configured of the second substrate, the second electrode, the electrophoretic layer or the first substrate based on electrode pattern generated in the generating step; and
bonding the electrophoretic medium to the first substrate after forming the first electrode in the forming step.

2. The manufacturing method according to claim 1, wherein the forming step forms the first electrode and the auxiliary electrode using an inkjet printing unit to eject ink formed of an electrode material.

3. The manufacturing method according to claim 1, wherein the generating step generates an electrode pattern having an orientation reversed left-to-right for text or image to be displayed on the display medium when forming the first electrode on the underside surface side of the display surface of the first substrate in the forming step, and
the forming step forms the first electrode by using a thermal transfer head to heat a transfer film, having a conducting material-containing layer with dispersed conductive particles and a heat fusible resin layer, based on the electrode pattern generated in the generating step, whereby the heat fusible resin layer is melted and the conducting material-containing layer is transferred.

4. A manufacturing method for manufacturing a display medium, the display medium comprising a transparent first substrate that constitutes a display surface; a second substrate that opposes an underside surface side of the display surface of the first substrate and separates from the underside surface with a prescribed gap; an electrophoretic layer that is disposed in the prescribed gap and has a liquid in which a plurality of charged particles are dispersed; a first electrode that is disposed between the first substrate and the electrophoretic layer and has a prescribed electrode pattern corresponding to a shape of text or image; an auxiliary electrode that is disposed between the first substrate and the electrophoretic layer so as to surround at least the electrode pattern of the first electrode; and a second electrode that is disposed between the second substrate and the electrophoretic layer, wherein voltages generating electric fields having different directions with the second electrode are applied to the first electrode and auxiliary electrode, causing the charged particles in the electrophoretic layer to move and produce a display corresponding to the shape of the first electrode, the manufacturing method comprising:
generating an electrode pattern so that when the text or image to be displayed on the display medium has an enclosed region, the enclosed region of the electrode pattern has a partially opened shape;
forming the first electrode and the auxiliary electrode on either the electrophoretic medium integrally configured of the second substrate, the second electrode, and the electrophoretic layer or the first substrate based on the electrode pattern generated in the generating step so that a gap is formed between the first electrode and auxiliary electrode, the auxiliary electrode comprising integrally and electrically connected electrodes disposed in a region surrounding the electrode pattern of the first electrode and a region corresponding to the enclosed region; and bonding the electrophoretic medium to the first substrate after forming the first electrode and the auxiliary electrode in the forming step.

5. The manufacturing method according to claim 4, wherein the forming step forms the first electrode and the auxiliary electrode using an inkjet printing unit to eject ink formed of an electrode material.

6. The manufacturing method according to claim 4, wherein the generating step generates an electrode pattern having an orientation reversed left-to-right for text or image to be displayed on the display medium when forming the first electrode on the underside surface side of the display surface of the first substrate in the forming step, and the forming step forms the first electrode by using a thermal transfer head to heat a transfer film, having a conducting material-containing layer with dispersed conductive particles and a heat fusible resin layer, based on the electrode pattern generated in the generating step, whereby the heat fusible resin layer is melted and the conducting material-containing layer is transferred.

7. The manufacturing method according to claim 4, wherein the generating step generates an electrode pattern having an orientation reversed left-to-right for text or image to be displayed on the display medium when forming the first electrode on the underside surface side of the display surface of the first substrate in the forming step, and the forming step forms the auxiliary electrode by using a thermal transfer head to heat a transfer film, having a conducting material-containing layer with dispersed conductive particles and a heat fusible resin layer, based on an electrode pattern generated in the generating step, whereby the heat fusible resin layer is melted and the conducting material-containing layer is transferred.

* * * * *